US008072624B2

(12) United States Patent  (10) Patent No.: US 8,072,624 B2
Suzuki  (45) Date of Patent: Dec. 6, 2011

(54) IMAGE PROCESSING DEVICE, METHOD, AND PROGRAM WITH EDITING, RANGE SETTING, AND PRINTING SCREEN CONDITIONALLY DISPLAYED WHEN APPLICATION IS STARTED

(75) Inventor: Takayuki Suzuki, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/796,506

(22) Filed: Jun. 8, 2010

(65) Prior Publication Data

US 2010/0245913 A1  Sep. 30, 2010

Related U.S. Application Data

(62) Division of application No. 11/727,988, filed on Mar. 29, 2007, now Pat. No. 7,751,073, which is a division of application No. 10/207,892, filed on Jul. 31, 2002, now Pat. No. 7,215,439.

(30) Foreign Application Priority Data

Jul. 31, 2001  (JP) ................................ 2001-232704
Jul. 29, 2002  (JP) ................................ 2002-219659

(51) Int. Cl.
G06K 15/02 (2006.01)
H04N 1/387 (2006.01)
G06F 3/12 (2006.01)

(52) U.S. Cl. ...... 358/1.13; 358/1.18; 358/452; 358/453; 358/527; 715/274

(58) Field of Classification Search ............... 358/1.9, 358/1.13, 1.15, 1.16, 1.18, 524, 527, 530, 358/537, 538, 444, 448, 452, 453, 3.27, 1.17; 715/273, 274, 277

See application file for complete search history.

(56) References Cited

U.S. PATENT DOCUMENTS

| 5,162,918 | A | 11/1992 | Muramatsu |
| 5,650,799 | A | 7/1997 | Melen |
| 5,828,461 | A | 10/1998 | Kubo et al. |
| 5,838,325 | A | 11/1998 | Deen et al. |
| 5,946,457 | A | 8/1999 | Nakai et al. |
| 6,154,755 | A | 11/2000 | Dellert et al. |

(Continued)

FOREIGN PATENT DOCUMENTS

JP  1027258  1/1989

(Continued)

OTHER PUBLICATIONS

Microsoft Word User's Guide, CCST Hong Kong University of Science and Technology, Jul. 1994, pp. 1-9.*

*Primary Examiner* — Scott A Rogers
(74) *Attorney, Agent, or Firm* — Fitzpatrick, Cella, Harper & Scinto

(57) ABSTRACT

To enable the operability of image editing process to improve, the first procedure for making configurations relating to a print medium used in printing by a printing device, the second procedure for selecting an image to be printed by the printing device and specifying its print range, the third procedure for making configurations relating to image processing for the image for which the print range is specified, and the fourth procedure for performing printing process of the image data to which the configured image processing is applied are executed.

21 Claims, 12 Drawing Sheets

U.S. PATENT DOCUMENTS

| | | | |
|---|---|---|---|
| 6,313,923 B1 | 11/2001 | Takanashi et al. | |
| 6,616,359 B1 | 9/2003 | Nakagiri et al. | |
| 6,701,458 B1 | 3/2004 | Hoshino | |
| 6,831,755 B1 | 12/2004 | Narushima et al. | |
| 7,010,176 B2 | 3/2006 | Kusunoki | |
| 7,019,851 B2 | 3/2006 | Kanazawa et al. | |
| 7,215,439 B2 * | 5/2007 | Suzuki | 358/1.18 |
| 7,345,783 B2 * | 3/2008 | Suzuki et al. | 358/1.18 |
| 7,426,058 B2 * | 9/2008 | Suzuki et al. | 358/1.18 |
| 7,751,073 B2 * | 7/2010 | Suzuki | 358/1.13 |
| 7,847,806 B2 * | 12/2010 | Mochizuki et al. | 345/619 |
| 2003/0025923 A1 * | 2/2003 | Suzuki | 358/1.9 |
| 2003/0081260 A1 | 5/2003 | Suzuki et al. | |
| 2006/0209368 A1 | 9/2006 | Suzuki et al. | |
| 2007/0177182 A1 | 8/2007 | Suzuki | |
| 2007/0253034 A1 * | 11/2007 | Watanabe et al. | 358/1.9 |
| 2008/0219598 A1 | 9/2008 | Suzuki et al. | |
| 2009/0091770 A1 | 4/2009 | Kano et al. | |

FOREIGN PATENT DOCUMENTS

| | | |
|---|---|---|
| JP | 2188067 | 7/1990 |
| JP | 10269048 | 10/1998 |
| JP | 2000332985 | 11/2000 |
| JP | 2001084245 | 3/2001 |
| JP | 2001117783 | 4/2001 |

* cited by examiner

IMAGE PROCESSING DEVICE, METHOD, AND PROGRAM WITH EDITING, RANGE SETTING, AND PRINTING SCREEN CONDITIONALLY DISPLAYED WHEN APPLICATION IS STARTED

This application is a divisional of U.S. patent application Ser. No. 11/727,988, filed Mar. 29, 2007, which issued as U.S. Pat. No. 7,751,073 on Jul. 6, 2010, and which is a divisional of application Ser. No. 10/207,892, filed Jul. 31, 2002, which issued as U.S. Pat. No. 7,215,439 on May 8, 2007, the contents of which are incorporated by reference herein.

BACKGROUND OF THE INVENTION

1. Field of the Invention

The present invention relates to an image processing device, image processing method, program, and storage medium for processing image data and causing a printing device to print the processed image.

2. Related background Art

Conventionally, when an image editing application is executed that is operable on such as Windows® 98, an operating system from Microsoft Inc., the screen displaying entries to be set by a user would not be switched according to the condition of necessary editing. Therefore, the user needed to select a menu and choose from it a menu entry for configuring image trimming or image printing to execute the process according to his/her editing condition.

However, the prior art had a problem as follows. That is, the conventional image processing method had a problem that a user had difficulty in finding which menu or button he/she should select to perform a necessary input. Also, since recent applications increasingly have a great number of image editing features, it is getting all the more difficult for the user to find an operation to be performed from a menu or buttons in an application.

SUMMARY OF THE INVENTION

The invention was made in view of the above respects and has the object of improving the operability of image editing process.

To attain the object, the image processing device according to the invention is an image processing device for processing image data and having the processed image data printed by a printing device, characterized in that it comprises control means for executing:

a first procedure for making configurations relating to a print medium used in printing by the printing device;

a second procedure for selecting an image to be printed by the printing device and specifying its print range;

a third procedure for making configurations relating to the image processing of the image for which the print range was specified; and a fourth procedure for performing the printing process of the image data to which the configured image processing was applied.

The image processing method according to the invention is an image processing method for processing image data and having the processed image data printed by the printing device, characterized in that it has:

a first procedure for making configurations relating to a print medium used in printing by the printing device;

a second procedure for selecting an image to be printed by the printing device and specifying its print range;

a third procedure for making configurations relating to the image processing of the image for which the print range was specified; and a fourth procedure for performing the printing process of the image data to which the configured image processing was applied.

The computer readable program according to the invention is a program for processing image data and having the processed image data printed by the printing device, characterized in that it has:

a first procedure for making configurations relating to a print medium used in printing by the printing device;

a second procedure for selecting an image to be printed by the printing device and specifying its print range;

a third procedure for making configurations relating to the image processing of the image for which the print range was specified; and a fourth procedure for performing the printing process of the image data to which the configured image processing was applied.

DETAILED DESCRIPTION OF THE PREFERRED EMBODIMENTS

The overview of the invention will be first described prior to the description of its embodiments.

The invention realizes further improvements of the operability of image editing process by switching displays listing configuration entries corresponding to each procedure depending on how an application is launched, in an application of image editing process for editing image data adapted for a printing device and also for having the printing device print the result of the editing. Now, the embodiments of the invention will be described in detail based on the drawings.

Figure 1:
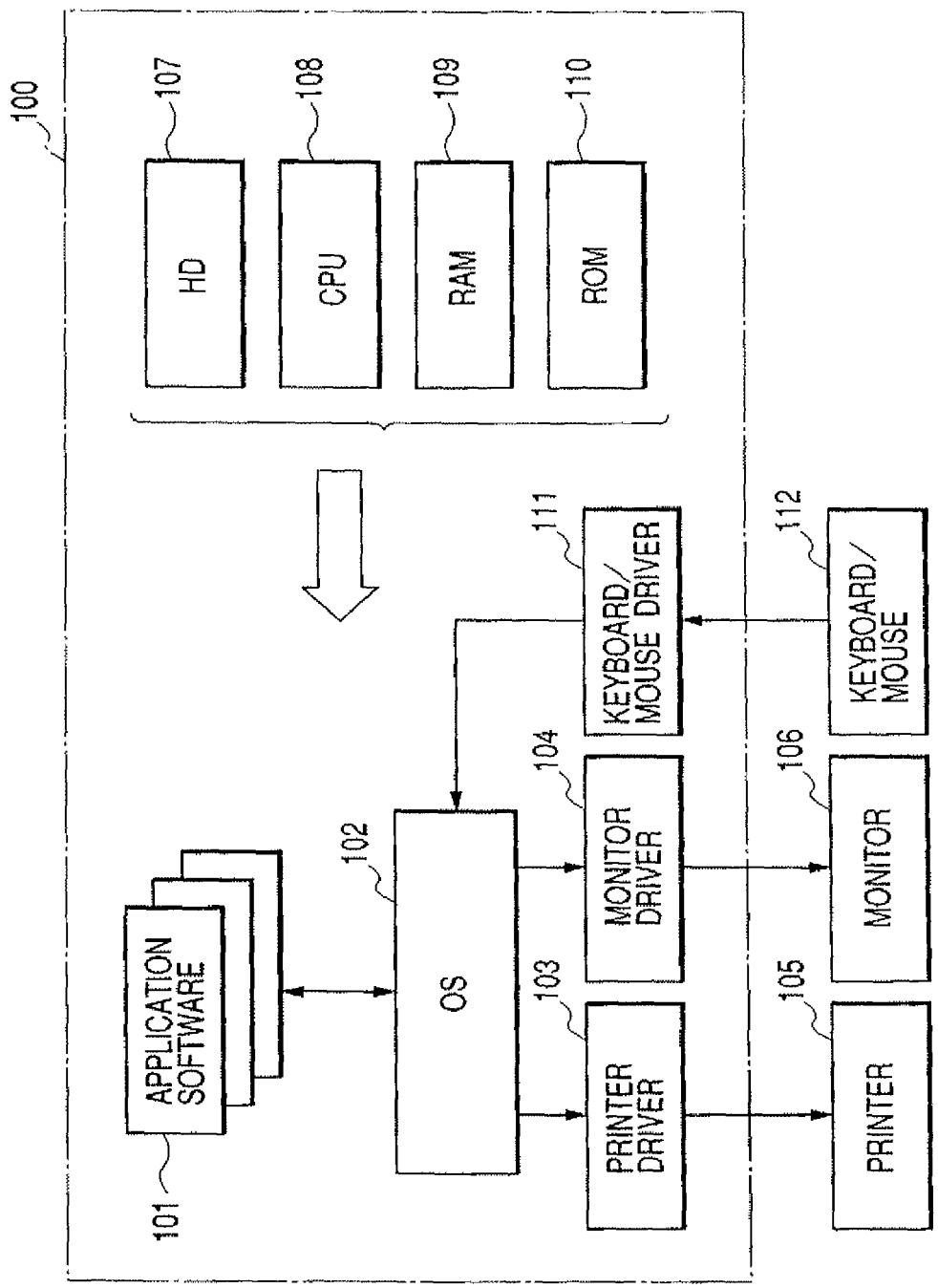
FIG. 1 shows a block diagram illustrating an exemplary configuration of the image processing device according to an embodiment of the invention.

FIG. 1 is a block diagram showing an example of the configuration of the image processing device according to an embodiment of the invention. The image processing device consists of a host computer 100 which comprises application software 101, an operating system (OS) 102, printer driver 103, monitor driver 104, hard disk (HD) 107, CPU 108, RAM 109, ROM 110, and keyboard/mouse driver 111; a keyboard/mouse 112 as an input device connected to the host computer 100; a printing device (printer) 105 as an output device such as an inkjet printer connected to the host computer 100; and a monitor 106 as an output device connected to the host computer 100.

More particularly, the application software 101 is software such as word processor, spreadsheet, or Internet browser on the host computer 100. The operating system (OS) 102 processes outputs of various instructions for the printer driver 103 and the monitor driver 104 to be mentioned in the following. The printer driver 103 controls driving of the printer 105. The monitor driver 104 controls the display of the monitor 106. The hard disk (HD) 107 stores various types of data. The CPU 108 is the central processing device controlling each of the above elements and executes processes shown in the respective flow charts to be described later. The RAM 109 is used as a work area or temporary storage area for the CPU 108. The ROM 110 stores programs and fixed data. The keyboard/mouse driver 111 conveys input signals from the keyboard/mouse 112 to the OS 102.

The programs relevant to the flow charts shown in FIGS. 2 to 5 to be mentioned later are stored in the hard disk (HD) 107 or ROM 110 and appropriately read by the CPU 108 to be executed.

The printing device (printer) 105 performs printing on a print medium based on the control of the printer driver 103. The printing device (printer) 105 can employ any type of printing processes such as the above-mentioned inkjet printing and electrophotography printing. The monitor 106 displays various screen displays including screens shown in FIGS. 6 to 9, which will be later described, based on the control of the monitor driver 104. The keyboard/mouse 112 is used for inputting various data and various designations.

More specifically, the host computer 100 comprises the keyboard/mouse 112 in order to receive inputs from users. The inputs received on the keyboard/mouse 112 are processed by the keyboard/mouse driver 111 and passed to the operating system (OS) 102. Also, the host computer 100 has the application software 101 such as word processor, spreadsheet, and Internet browser.

When an image is to be displayed on the monitor 106, various rendering processing instructions for outputting the image by display (image rendering instructions, text rendering instructions, and graphics rendering instructions), issued by the application software 101, are input to the monitor driver 104 via the OS 102. And when printing is performed by the printing device (printer) 105, rendering instructions issued by the application software 101 for carrying out printings are also input to the printer driver 103 via the OS 102. The printer driver 103 is software for processing such rendering instructions to generate printing data and having the printing device (printer) 105 print it. The monitor driver 104 is software for processing the above rendering instructions and having the monitor 106 display images.

The host computer 100 comprises pieces of hardware such as the CPU 108, hard disk (HD) 107, RAM 109, and ROM 110 for storing the above software and running them. In this regard, it is possible to use an IBMAT-compatible personal computer which is widely used as the host computer 100 shown in RIG. 1, and to use Windows® 98 from Microsoft Inc. as the OS 102. And such a configuration is possible that the personal computer of the above type has any application software with printing feature installed in it and the monitor 106, printing device (printer) 105, and keyboard/mouse 112 connected to it.

On the host computer 100, image data for output is generated by the application software 101 based on the image displayed on the monitor 106 using text data that is classified as text such as characters, graphics data classified as graphics such as figures, or picture image data classified as photographic images. And when images based on the output image data are to be printed, the application software 101 requests the OS 102 of print output and issues rendering instructions to the OS 102 that consist of text rendering instructions for text data portion, graphics rendering instructions for graphics data portion, and image rendering instructions for picture image data portion.

On receipt of the request for print output from the application software 101, the OS 102 passes the rendering instructions to the printer driver 103 that corresponds to the printer 105. The printer driver 103 processes the request and the instructions passed from the OS 102 to generate printing data which can be processed by the printing device (printer) 105 and sends it to the printing device (printer) 105. If the printing device (printer) 105 is a raster printer for example, the printer driver 103 rasterizes the rendering instructions consecutively into band memory which has 8-bit depth for each of RGB (R: red, G: green, B: blue). After all of the rendering instructions have been rasterized, the printer driver 103 converts the content in page memory to data format which can be printed by the printing device (printer) 105, for example CMYK (C: cyan, M: magenta, Y: yellow, K: black)data, and sends it to the printer 105. The band memory is allocated in the RAM 109, for example.

In the following, the flow of image processing through the image processing device according to an embodiment of the invention which is configured as the above will be described in detail with reference to FIGS. 1 to 9.

(The First Procedure)

Figure 2:
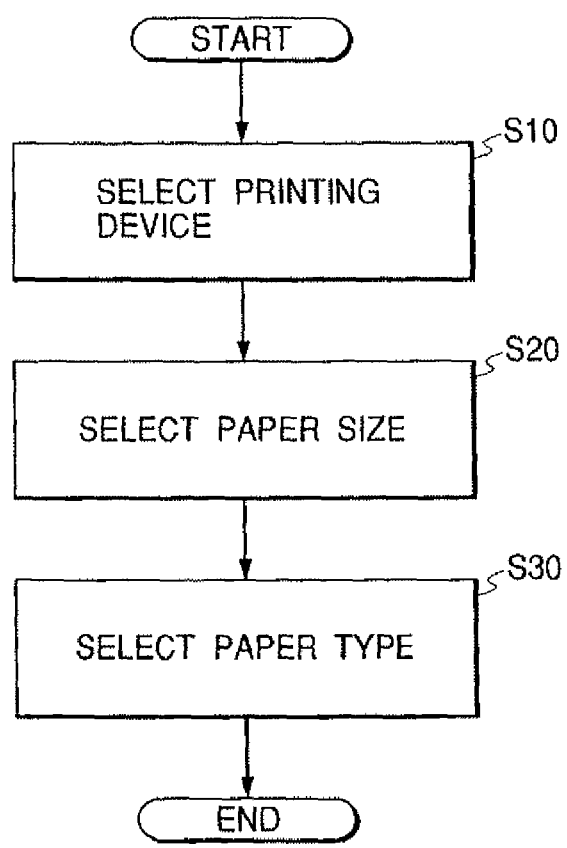
FIG. 2 shows a flow chart illustrating the first procedure according to an embodiment of the invention.

FIG. 2 is a flow chart showing the flow of the first procedure. This flow chart is performed by the CPU 108 of the host computer 100. First, at the step S10 the CPU 108 selects a printing device 105 from peripheral devices (input/output devices) connected to the host computer 100 according to a user's designation with a pointing device etc. Then at the step S20, based on information from the printer driver 103 and according to the user's designation with a pointing device etc, the CPU 108 selects a paper size for printing from the sizes supported by the printing device 105 which was selected at the step S10. At the step S30, based on the information from the printer driver 103, the CPU 108 then selects the type of paper such as plain paper and photographic paper as the type of the paper with the size selected at the step S20 according to the user's designation with a pointing device etc.

(The Second Procedure)

Figure 3:
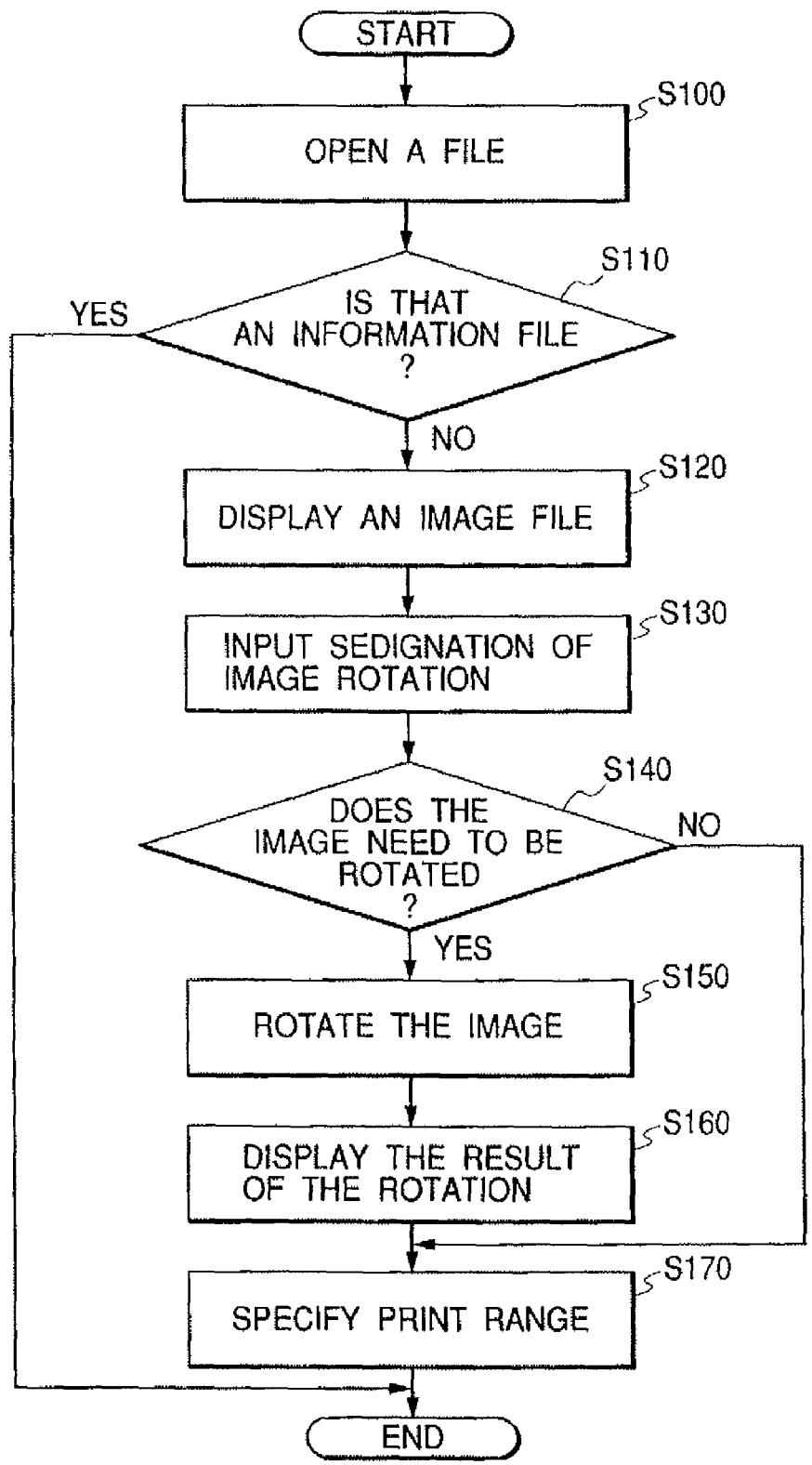
FIG. 3 shows a flow chart illustrating the second procedure according to an embodiment of the invention.

FIG. 3 is a flow chart showing the flow of the second procedure. This chart is performed by the CPU 108 of the host computer 100. First at the step S100, the CPU 108 reads an image file subjected to image processing or an information file to be created with this image processing method from a storage device such as the hard disk 107. Then at the step S110, the CPU 108 examines whether or not the file read from the storage device like the hard disk 107 at the step S100 is an information file which will be created with the image processing method.

If it is determined at the step S110 that the file read from the storage device such as the hard disk 107 is not an information file to be created according to the image processing method, than the CPU 108 displays an image file read from the storage device such as the hard disk 107 on the monitor 106 by means of the monitor driver 104 at the step S120.

When the image is displayed, it is necessary to consider the size of the image to be displayed depending on the paper type (postcard, A4), since full-page printing is supported in postcard printing, whereas not in A4 printing. Specifically, when postcard is specified, the area that will be printed overflowing (12 pixels for each of four sides, for example) is removed from the original image (800×600 pixels, for example) for full-page printing and an image smaller than the original one (776×576 pixels, for example) is displayed, whereas when A4 is specified, the original image (800×600 pixels, for example) is displayed as it is. Processed in this way, images can be printed as trimmed.

At the step S130, the CPU 108 then receives the input of the rotation angle for the image. And at the step S140, the CPU 108 determines whether or not the rotation angle for the image received at the step S130 is different from that of the image displayed on the monitor 106 at the step S120.

If, at the step S140, it is determined that the rotation angle of the image received at the step S130 is different from that of the image being displayed on the monitor 106 at the step S120, at the step S150 the CPU 108 processes the image by rotating it with the rotation angle received at the step S130 and, at the step S160, displays the processing result on the monitor 106 by means of the monitor driver 104. Then at the step S170, the CPU 108 specifies the print range (trimming area) for the image file read from the storage device such as the hard disk 107 at the step S100.

Figure 7:
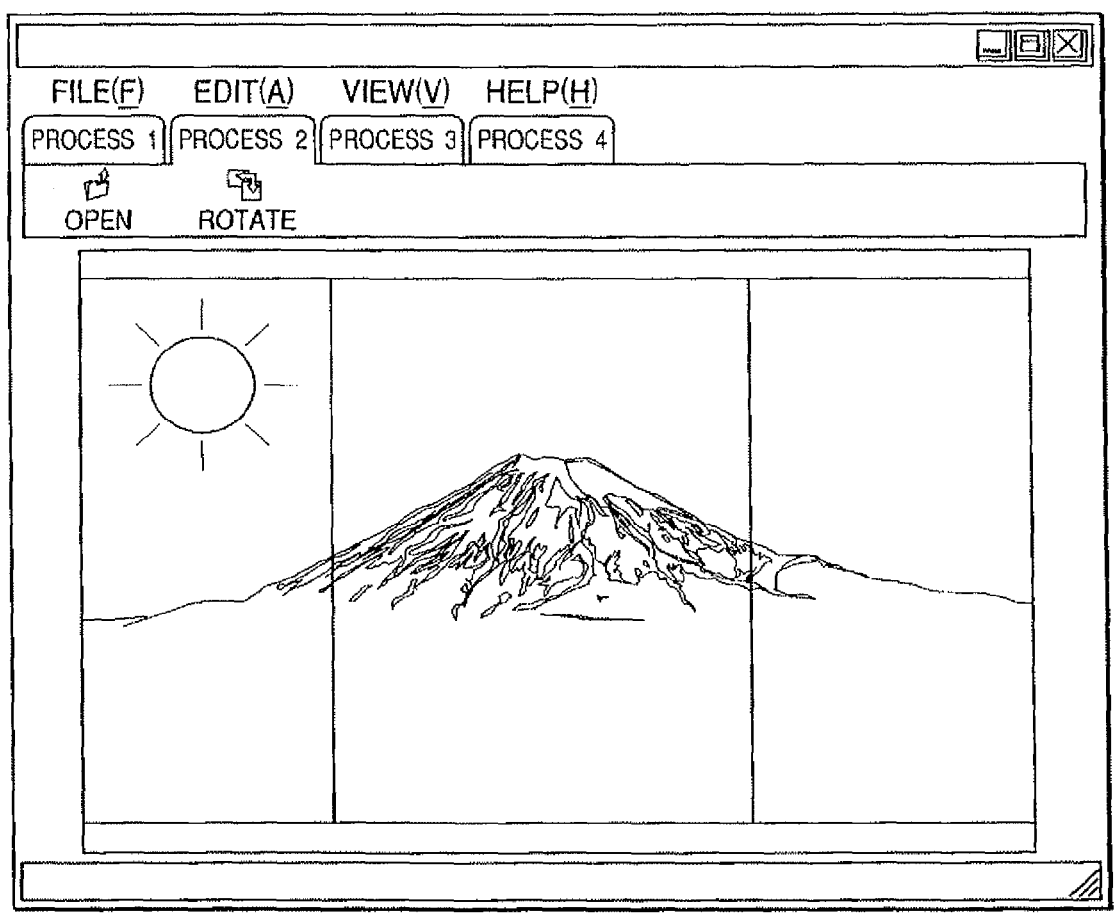
FIG. 7 is an illustration showing an exemplary screen display for performing the second procedure according to an embodiment of the invention.

As the specification of a print range is processed, a trimming frame (701) based on the aspect ratio of the paper size (postcard, A4, card, etc.) selected in the first procedure is displayed. At this point, the paper size is compared with the image size and a trimming frame is displayed in its largest size that matches either the vertical or horizontal length. In the example of FIG. 7, the size of the trimming frame matches the image in its vertical size and the horizontal size depends on the vertical size. Then, the display of the trimming frame is modified according to scaling operations to the frame by the user with a pointing device etc.

If, at the step S140, it is determined that the rotation angle received at the step S130 is equal to that of the image displayed on the monitor 106 at the step S120, the process for the step S170 is executed. Also, if it is determined at the step S110 that the file read from the storage device such as the hard disk 107 is an information file to be created with the image processing, the second procedure is terminated.

(The Third Procedure)

Figure 4:
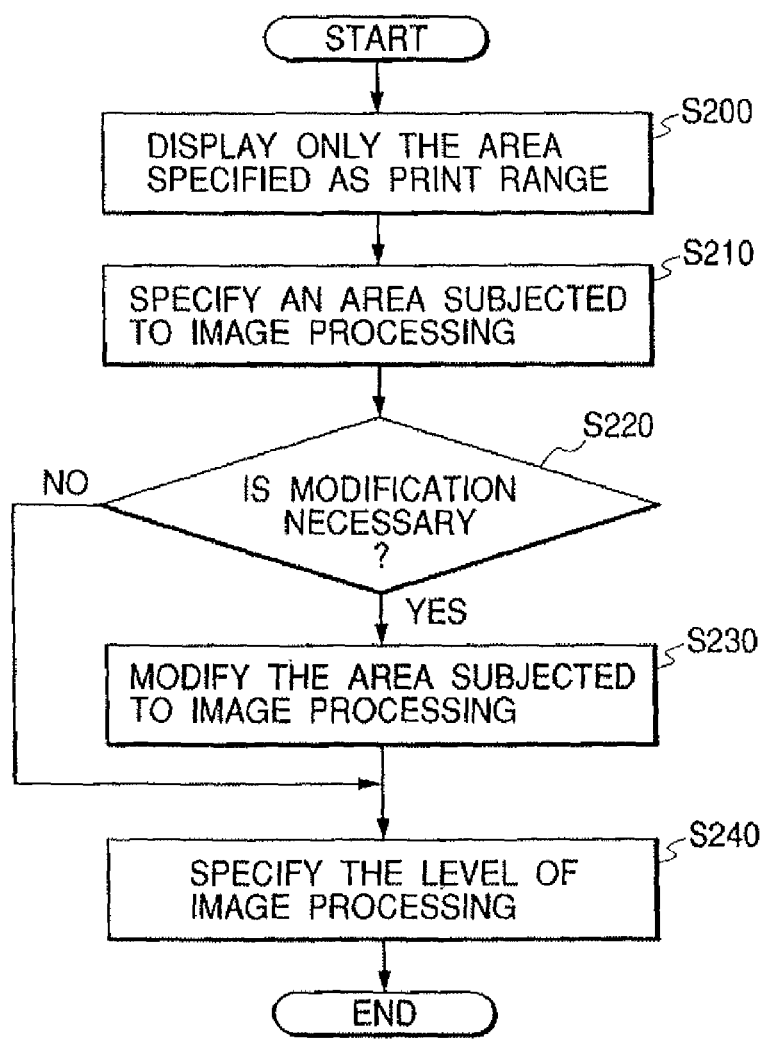
FIG. 4 shows a flow chart illustrating the third procedure according to an embodiment of the invention.

FIG. 4 is a flow chart showing the flow of the third procedure. This flow chart is performed by the CPU 108 of the host computer 100. First, at the step S200, the CPU 108 displays only the area of the image file on the monitor 106 which was specified as the print range at the step 5170 in the second procedure shown in FIG. 3 via the monitor driver 104. Then at the step S210, the CPU 108 specifies an area subjected to image processing within the area displayed on the monitor 106 at the step S200 according to the user's designation with a pointing device. This area designation could be a designation with a polygon (801) with its vertices specified by a pointing device, for example. Then at the step S220, the CPU 108 receives an input as to whether the area specified for image processing at the step S210 will be modified or not.

If an input for modifying the area subjected to image processing is received at the step S220, the CPU 108 modifies the area for image processing at the step S230. At the step S240, the CPU 108 then specifies the level of image processing for the area subjected to image processing specified at the step S210, or the area subjected to image processing modified at the step S230. Here, the level of image processing refers to the amount of raising when giving a photograph three-dimensional appearance for example, although the invention is not limited to this.

(The Fourth Procedure)

Figure 5:
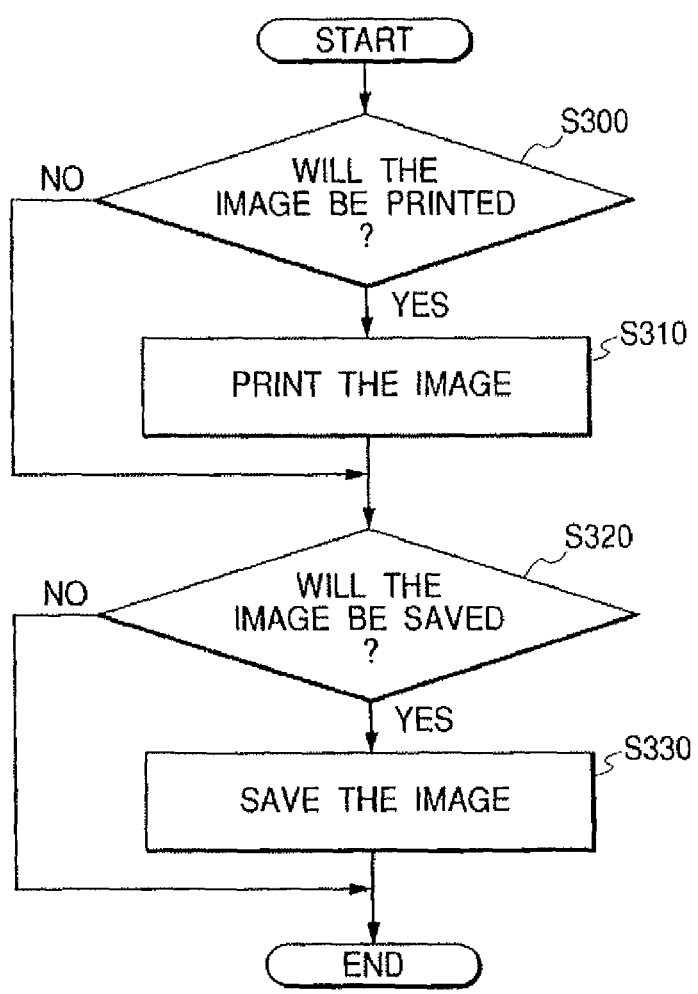
FIG. 5 shows a flow chart illustrating the fourth procedure according to an embodiment of the invention.

FIG. 5 is a flow chart showing the fourth procedure. This flow chart is performed by the CPU 108 of the host computer 100. First at the step S300, the CPU 108 receives an input as to whether or not printing process will be performed by the printing device 105 according to the configurations in the first, second, and third procedures. If the CPU 108 receives a designation for performing printing process at the step S300, it executes printing process for the image data which has been processed with three-dimensional effect of the level specified at the step S240 within the area specified at the step S210 by means of the printer driver 103. In this process, image processing for generating image data suitable for the printing device having a specific resolution, scaling process of the image according to the area trimmed at S170 and the paper size specified at S20, color conversion process from RGB to YMCK, or binarization process is carried out. Subsequently, at the step S320 the CPU 108 receives an input as to whether the configuration information for the first, second, and third procedures will be saved or not. If it has received a designation for saving the information at the step S320, the CPU 108 saves it in a storage device such as the hard disk 107 at the step S330.

(The Execution of the First, Second, Third, and Fourth Procedures)

Now, the execution of the first, second, third, and fourth procedures will be described for the case the image processing method is an application operable on Windows® 98 from Microsoft Inc, for example.

When image processing is directly executed, the first procedure is first accepted and subsequently the second, third, and fourth procedures will be accepted. And when the start of the image processing method is instructed on the monitor 106 on which an image read from a storage device such as the hard disk 107 is displayed, the second procedure is accepted and after that the third and fourth procedures will be accepted. And when the start of the image processing method was instructed based on information saved in the fourth procedure, the fourth procedure is accepted.

Figure 6:
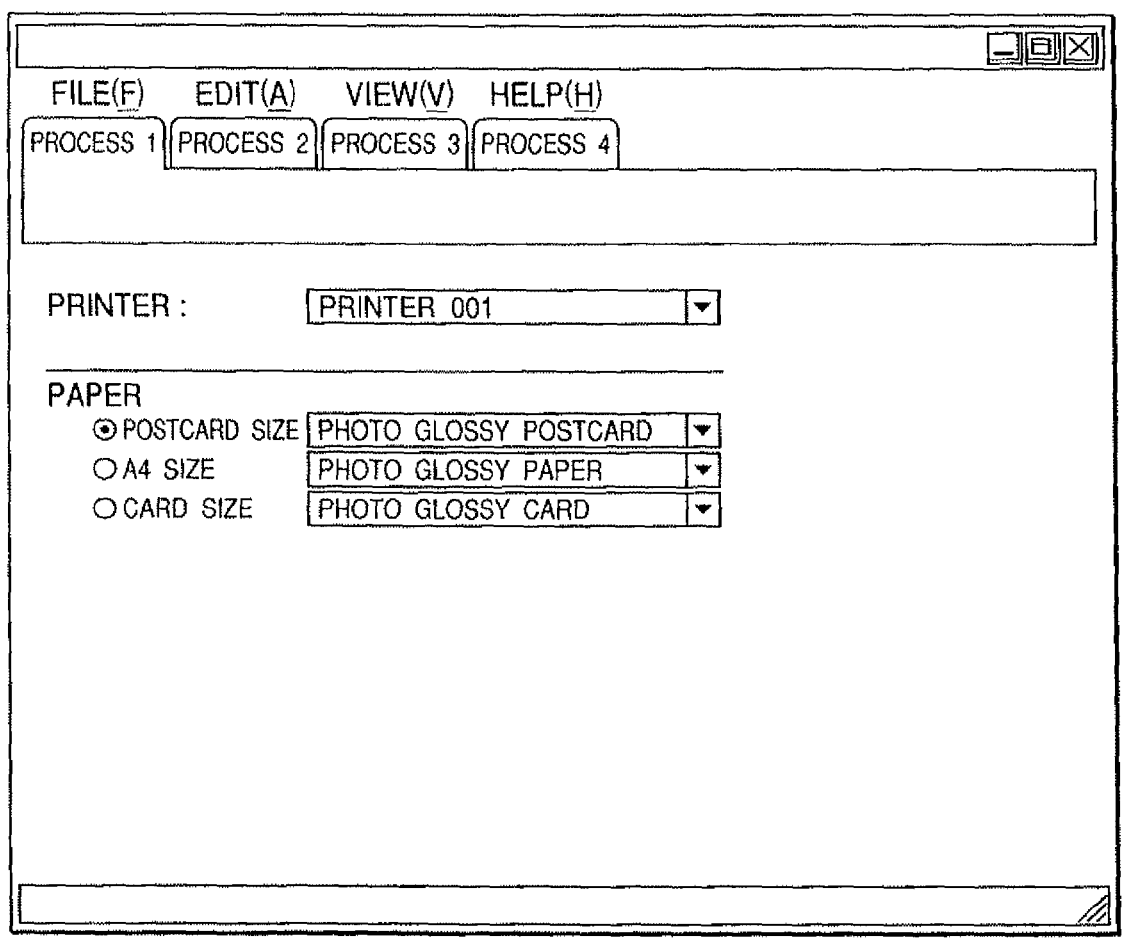
FIG. 6 is an illustration showing an exemplary screen display for performing the first procedure according to an embodiment of the invention.
Figure 8:
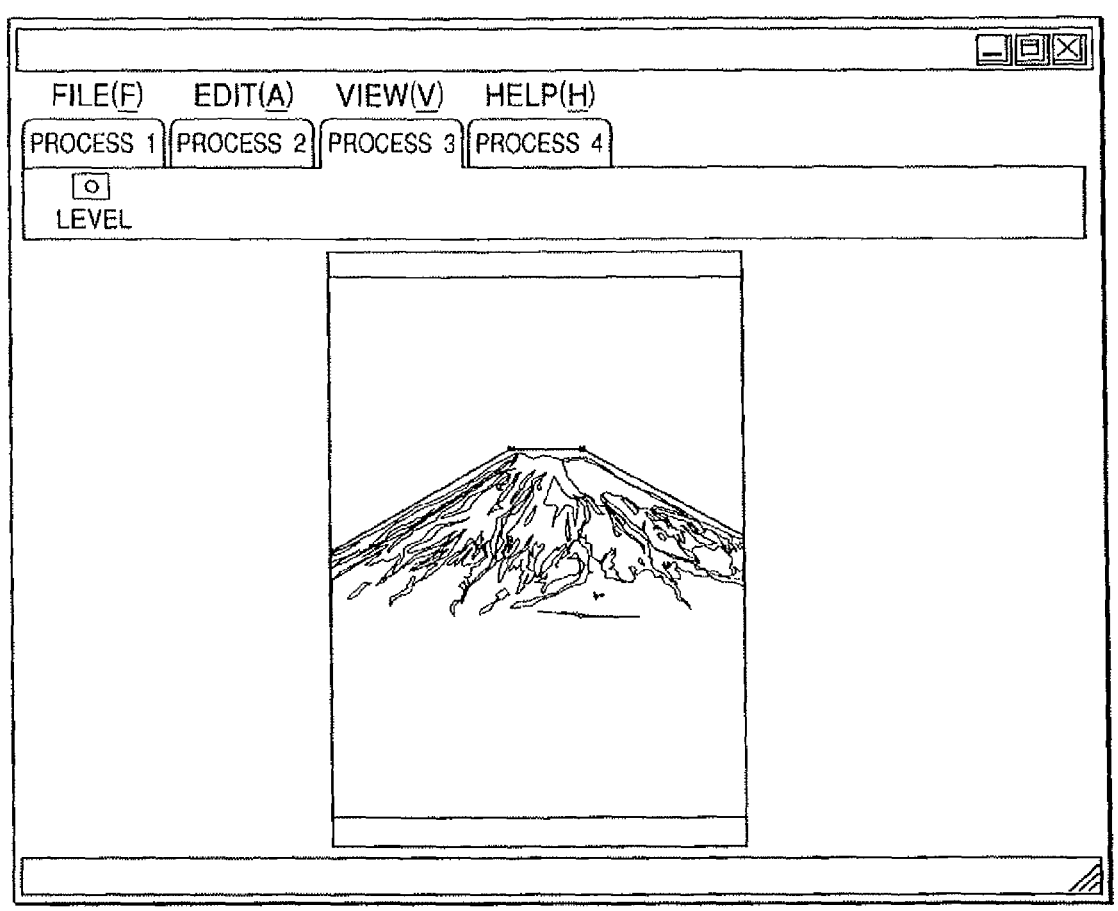
FIG. 8 is an illustration showing an exemplary screen display for performing the third procedure according to an embodiment of the invention.
Figure 9:
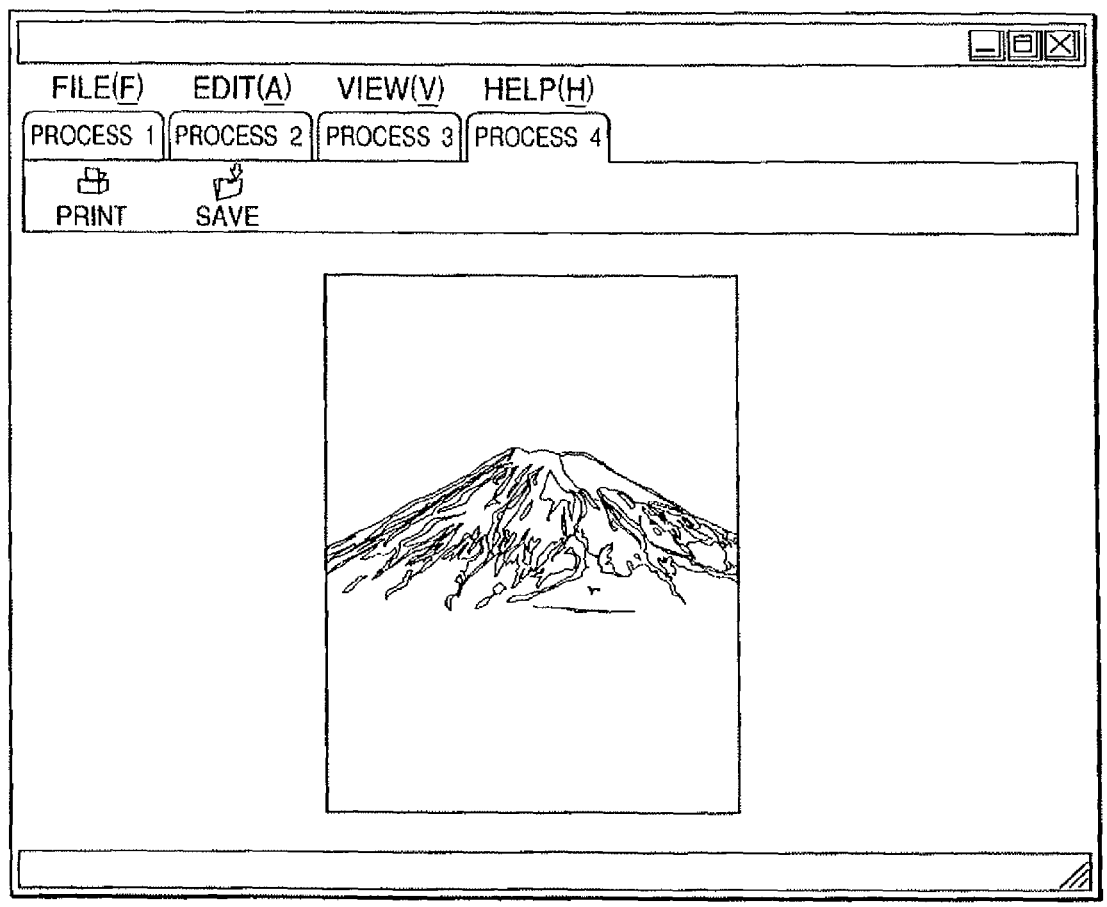
FIG. 9 is an illustration showing an exemplary screen display for performing the fourth procedure according to an embodiment of the invention.
Figure 10:
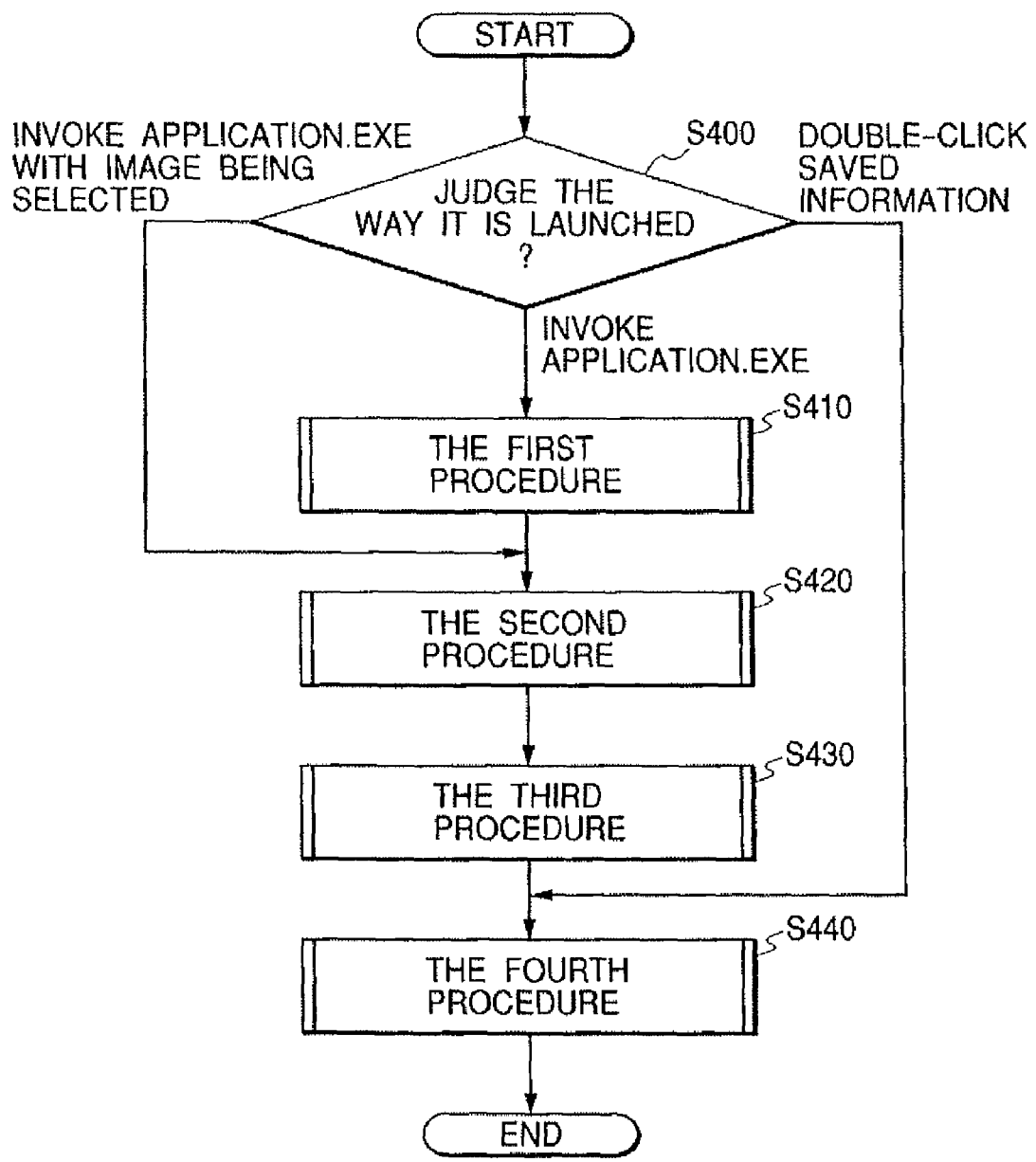
FIG. 10 shows a flow chart illustrating a procedure according to an embodiment of the invention.

In an embodiment of the invention, the executable file for the application in which the image processing method is implemented is named "Application.exe". As shown in FIG. 10, the application in which the image processing is implemented determines at the step S400 how it is launched at the start-up. If, at the step S400, the application in which the image processing is implemented is instructed to start by double-clicking the "Application.exe" using such as file manipulation utility, the screen for executing the first procedure is first displayed on the monitor 106 (see FIG. 6) since the first to forth procedures have to be executed. FIG. 6 shows an exemplary display which shows the printing device (printer) to be selected, paper sizes to be selected, and the paper types to be selected. Then at the step S410 the first procedure is performed. Subsequently, at the step S420 the screen as shown in FIG. 7 is displayed on the monitor 106 for the execution of the second procedure. FIG. 7 is an exemplary screen on which the print range (the mountain in the center of the screen) is specified on the image being displayed on the monitor 106. And at the step S430 the screen as shown in FIG. 8 is displayed on the monitor 106 for executing the third procedure. FIG. 8 is an exemplary screen for specifying the level of image processing. Finally, at the step S440 the screen as shown in FIG. 9 is displayed on the monitor 106 for executing the fourth procedure. FIG. 9 is an example of the screen for specifying the printing of the result of the image processing and saving of information in a storage device such as the hard disk 107.

Figure 11:
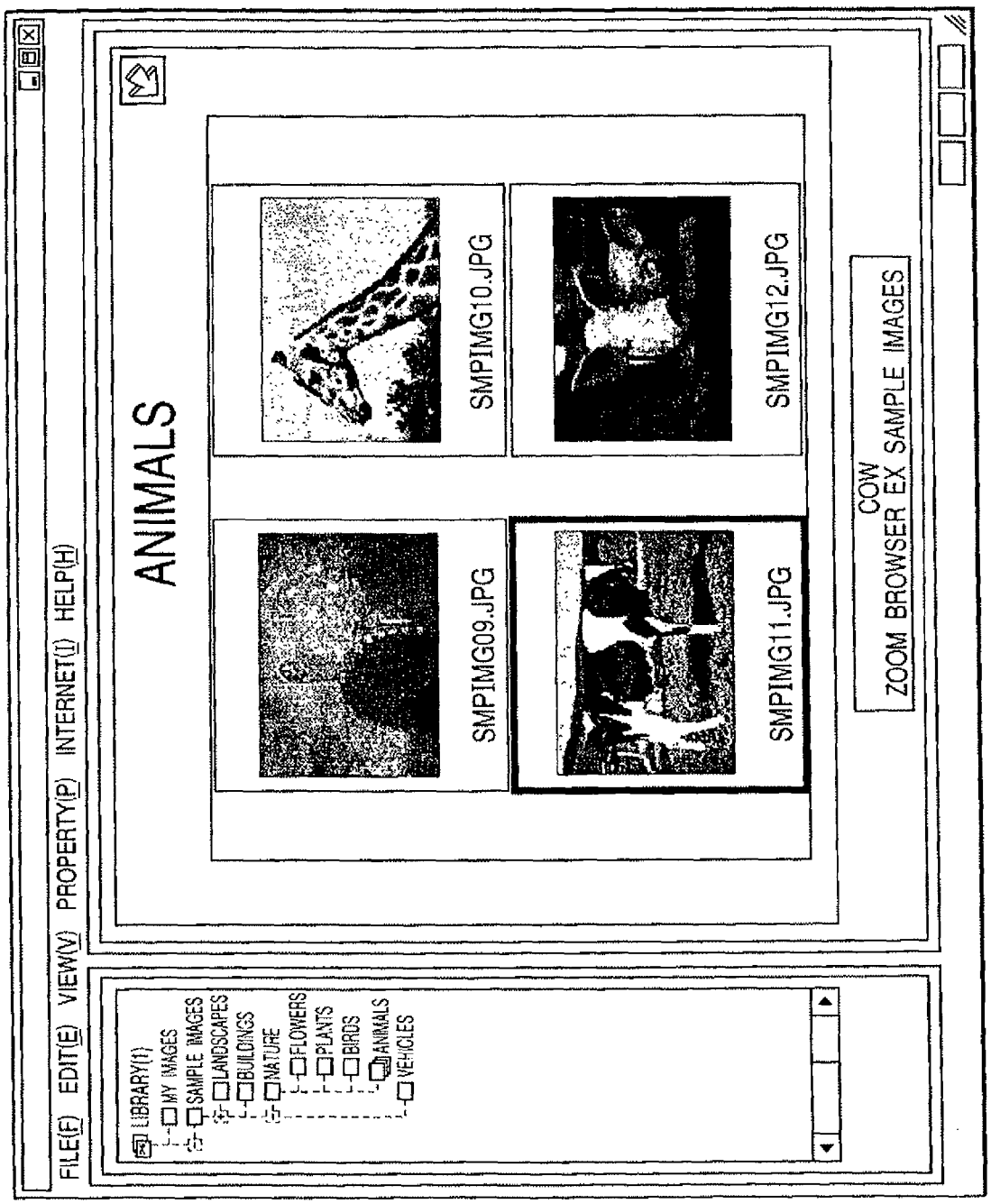
FIG. 11 is an illustration showing an exemplary screen display for software for selecting an image according to an embodiment of the invention.
Figure 12:
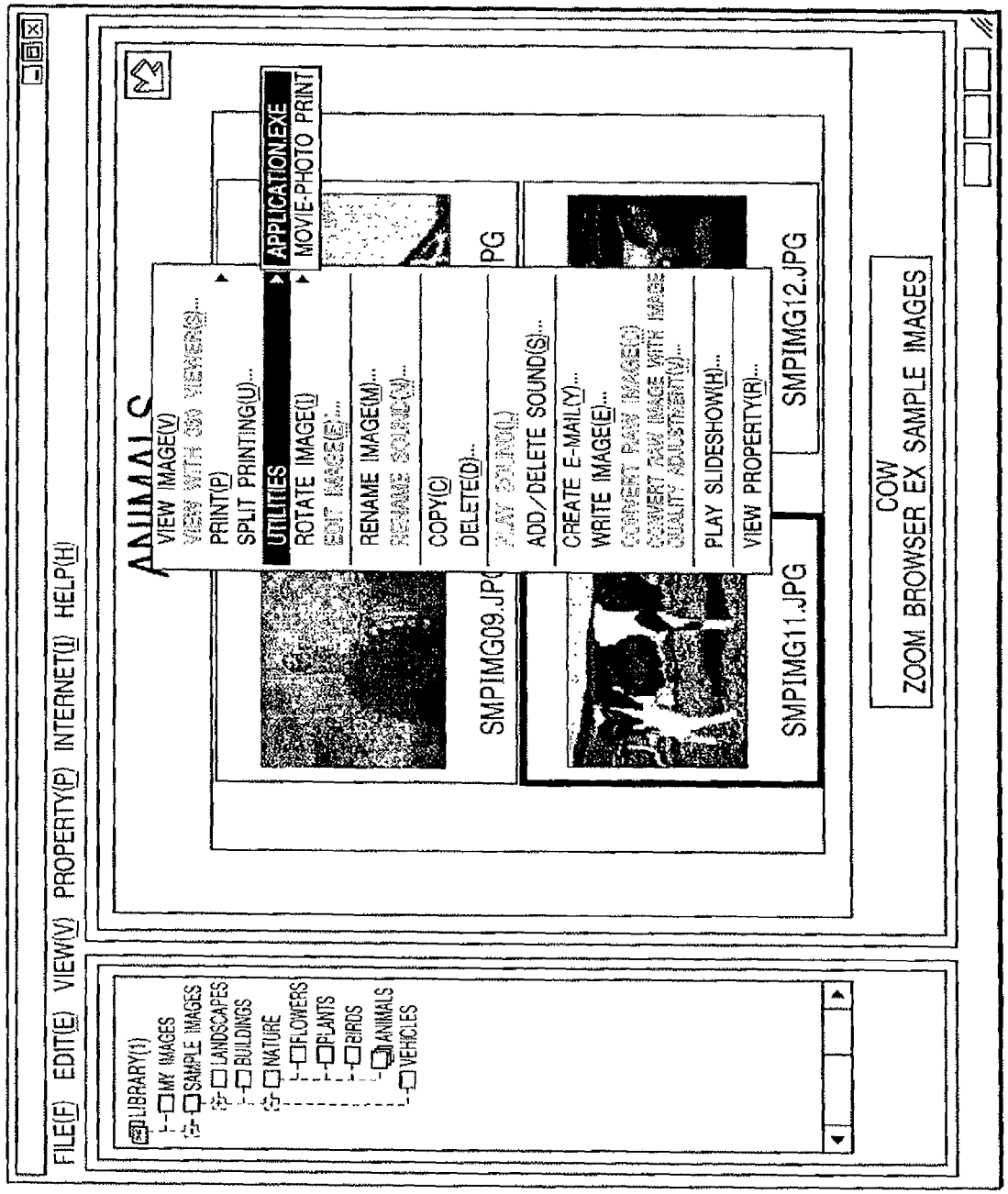
FIG. 12 is an illustration showing an exemplary screen display for software for selecting an image according to an embodiment of the invention.

If, at the step S400, the application in which the image processing is implemented is launched with an image being selected from multiple images on the monitor 106 on which images read from a storage device such as the hard disk 107 are displayed, the screen for performing the second procedure is displayed on the monitor 106 immediately after "Application.exe" is invoked, since the operation for specifying an image file has been already done (see FIG. 7). Specifically, an image is selected by clicking a mouse on a displayed image on software that handles multiple image files as shown in FIG. 11. And a right click of the mouse on the selected image displays a submenu listing operation options for the selected image as shown in FIG. 12. By selecting "Application.exe" from the displayed submenu, the "Application.exe" is invoked with the selected image being loaded. The processes for steps S420 to S440 are then executed in sequence. The entries to be shown in the submenu are based on the content described in a particular file for the display of the submenu. Accordingly, when software is to be installed so that the "Application.exe" can be used on a computer, the "Application.exe" will be displayed as one of the options in the submenu as shown in FIG. 12 by adding an entry for "Application.exe" to the particular file.

If, at the step S400, the application in which the image processing is implemented is instructed to start by double-clicking a file that was saved in the application by means of such as file manipulation utility, the screen for performing the fourth procedure is displayed on the monitor 106 (see FIG. 9) right after "Application.exe" is invoked since all the configurations have been already made. And the step S400 is processed.

As described in the above, according to the embodiment of the invention, the host computer 100 which performs the image editing process for editing image data suitable for the printing device 105 and also has the result of editing printed by the printing device 105 provides advantages as described in the following, since it, depending on how the application is launched, controls displays by switching displays listing configuration entries that correspond to the first procedure for making configurations relating to a print medium used in the printing by the printing device 105; the second procedure for selecting an image to be printed by the printing device 105 and specifying its print range; the third procedure for making configurations relating to the image processing for the image for which the print range was specified; and the fourth procedure for performing image processing to generate image data suitable for the printing device 105.

The invention enables image processing to be performed with minimum operations by, depending on how the application is launched, determining the information that is already configured and displaying a configuration screen corresponding to additional information, rather than starting the display with a screen for setting the initial procedure irrespective of how the application is launched. This can further improve the operability of image editing process. Also, by including a printing function in image editing process, it is possible to easily output images processed with editing to a printing device.

Other Embodiments

Although the case where the printing device uses inkjet as its printing process has been described as an example in the above embodiment of the invention, the invention is not limited to inkjet but also can be applied to various printing processes such as electrophotography printing, thermal transfer printing, thermal printing, electrostatic printing and so on.

The invention may be applied to a system that consists of multiple devices (a host computer, interfacing device, reader, and printer, for example), or a device that consists of a single device (a copying machine or facsimile machine, for example).

It goes without saying that the object of the invention can be also attained by providing a system or device with a storage medium (or a recording medium) that records the program codes of software for realizing functions of the above embodiment so that the computer (or CPU, MPU) of the system or device reads and executes the program codes stored in the storage medium.

In this case, the program codes themselves which are read from a medium like a storage medium realize the functions of the above embodiment and the medium such as a storage medium in which the codes are stored constitutes the invention. For the medium as the storage medium supplying the program codes, a Floppy® disk, hard disk, optical disk, magneto-optical disk, CD-ROM, CD-R, magnetic tape, non-volatile memory card, and ROM, etc. can be employed for example.

Also, needless to say, such a case is included in the invention where not only the functions of the above embodiment are realized by executing program codes read by a computer, but an OS etc. running on the computer performs some or all of the actual processes based on the designations of the codes and which processes realize the functions of the above embodiment.

Moreover, it goes without saying that such a case is also included in the invention where after program codes read from a medium such as a storage medium have been written into memory provided on a function expansion board inserted into a computer or a function expansion unit connected to a computer, a CPU etc. that resides on the board or the unit executes some or all of the actual processes according to the designations of the program codes and which processes realize the functions of the above embodiment.

If the invention is applied to the above storage medium, the medium will store the program codes that correspond to the flow charts in FIGS. 2 to 5 of the embodiment mentioned above.

Thus, the operability of image editing process can be improved according to the invention. And image editing process can be performed with minimum operations since the invention accepts predetermined procedures according to how it is launched.

What is claimed is:
1. An information processing apparatus comprising:
an execution unit configured to execute an application; and
a control unit configured to control displaying such that an image editing screen is displayed for image editing when the application is started in a condition that an image is selected, and such that another display a printing screen is displayed for printing an image edited on the image editing screen when the application is started based on a file saved by the application.

2. An information processing apparatus according to claim 1, wherein the image editing screen includes at least one of a display screen for rotating an image and a display screen for specifying a print range of the image.

3. An information processing apparatus according to claim 1, wherein the image editing screen includes a display screen for specifying a degree of image processing.

4. An information processing apparatus according to claim 1, wherein the printing screen includes a display screen for saving setting information set on the image editing screen.

5. A non-transitory computer-readable storage medium for retrievably storing an application program, the program comprising:
controlling an image editing screen to be displayed for image editing when the application is started in a condition that an image is selected; and
controlling a printing screen to be displayed for printing an image edited on the image editing screen when the application is started based on a file saved by the application.

6. A storage medium according to claim 5, wherein the image setting screen includes at least one of a display screen for rotating an image and a display screen for specifying a print range of the image.

7. A storage medium according to claim 5, wherein the image editing screen includes a display screen for specifying a degree of image processing.

8. A storage medium according to claim 5, wherein the printing screen includes a display screen for saving setting information set on the image editing screen.

9. An information processing method carried out in a computer that stores an application program, the method comprising:
controlling an image editing screen to be displayed for image editing when the application is started in a condition that an image is selected; and
controlling a printing screen to be displayed for printing an image edited on the image editing screen when the application is started based on a file saved by the application.

10. An information processing method according to claim 9, wherein the image editing screen includes at least one of a display screen for rotating an image and a display screen for specifying a print range of the image.

11. An information processing method according to claim 9, wherein the image editing screen includes a display screen for specifying a degree of image processing.

12. An information processing method according to claim 9, wherein the printing screen includes a display screen for saving setting information set on the image editing screen.

13. An information processing apparatus comprising:
a first display control unit configured to control displaying such that a range setting screen is displayed for setting a range of an image when an application is started in a condition that the image is displayed;
a storing unit configured to store in a file an image of which a range is set; and
a second display control unit configured to control displaying such that an image of which a range is set is displayed when the application is started based on the file stored by the storing unit.

14. An information processing apparatus according to claim 13, wherein the range setting screen includes a display screen for rotating an image.

15. An information processing apparatus according to claim 13, wherein the range setting screen includes a display screen for specifying a degree of image processing.

16. A non-transitory computer readable storage medium for retrievably storing an application program, the program comprising:
controlling a range setting screen to be displayed for setting a range of an image when an application is started in a condition that the image is displayed;
storing in a file an image of which a range is set; and
controlling an image of which a range is set to be displayed when the application is started based on the stored file.

17. A storage medium according to claim 16, wherein the range setting screen includes a display screen for rotating an image.

18. A storage medium according to claim 16, wherein the range setting screen includes a display screen for specifying a degree of image processing.

19. An information processing method carried out in a computer that stores an application program, the method comprising:
controlling a range setting screen to be displayed for setting a range of an image when an application is started in a condition that the image is displayed;
storing in a file an image of which a range is set; and
controlling an image of which a range is set to be displayed when the application is started based on the stored file.

20. An information processing method according to claim 19, wherein the range setting screen includes a display screen for rotating an image.

21. An information processing method according to claim 19, wherein the range setting screen includes a display screen for specifying a degree of image processing.

* * * * *